Aug. 18, 1970  J. E. MASTERS ET AL  3,524,779
METHOD OF MAKING WOUND TUBULAR PRODUCTS
Filed Aug. 31, 1966
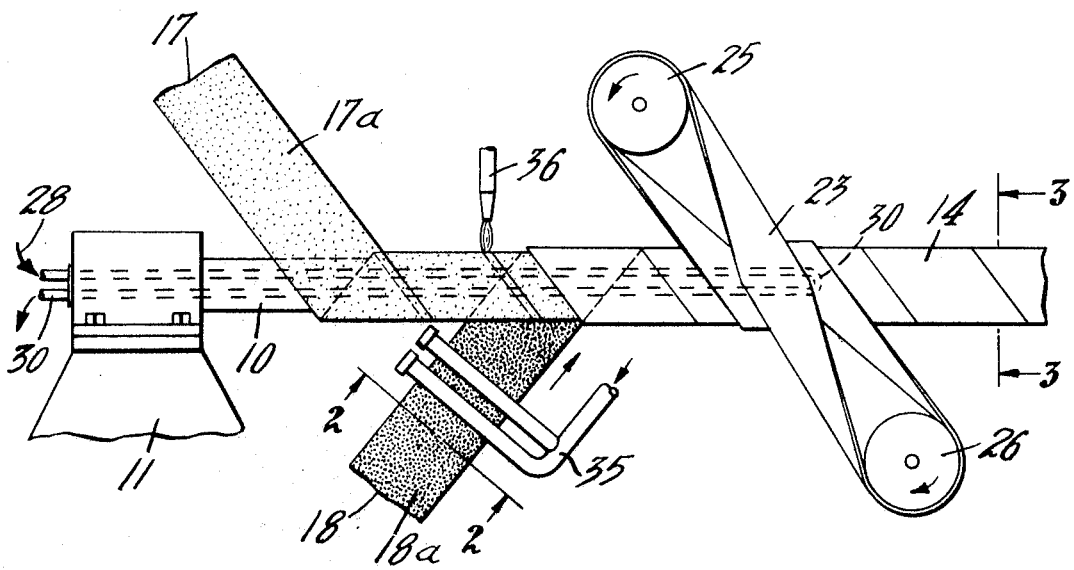
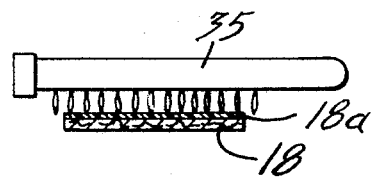
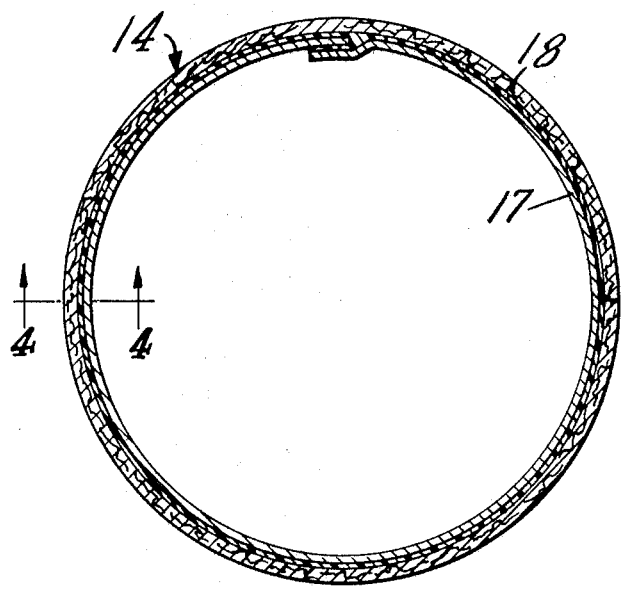
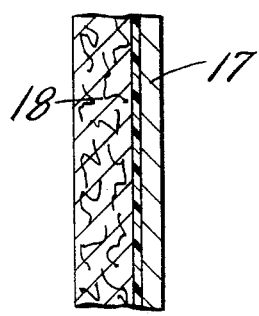
INVENTORS
JOHN EDMUND MASTERS
LAWRENCE MATHIAS SIMON
BY HUBERT JOSEPH GERMIA
Robert P. Auber
ATTORNEY United States Patent Office 3,524,779
Patented Aug. 18, 1970

3,524,779
METHOD OF MAKING WOUND TUBULAR PRODUCTS
John Edmund Masters and Lawrence Mathias Simon, Barrington, and Hubert Joseph Germiat, Fox River Grove, Ill., assignors to American Can Company, New York, N.Y., a corporation of New Jersey
Filed Aug. 31, 1966, Ser. No. 576,383
Int. Cl. B31c 9/00
U.S. Cl. 156—190
5 Claims

ABSTRACT OF THE DISCLOSURE

A method of making spirally wound tubing from a plurality of plies of material wherein at least one surface of one of said plies is precoated with a layer of a heat activatable adhesive and wherein the precoated strip is passed through a heating zone which extends longitudinally along the path or travel of the strip as it approaches the mandrel of the spiral winding machine in order to activate the adhesive and put sufficient heat into the strip to maintain it in a heated condition when it reaches the winding mandrel.

---

The present invention relates to tubular products in the form of spirally or convolutely-wound container bodies or tubes, and in particular, to an improvement in the method of making such tubular products.

Spirally or convolutely-wound containers or tubes are often constructed of a plurality of plies bonded together by means of a water-base adhesive. When the material in some or all of the plies is made of fibrous or other moisture-absorbing substance, a portion of the moisture used in conjunction with the adhesive is retained within the plies upon completion of the container manufacturing operation. This residual moisture in the container causes defects in the completed products to the extent that they are weakened and made less rigid. Furthermore, under these conditions, the adhesive layer between plies is not an effective barrier for preventing moisture prevailing in the surrounding air, from entering the wall of the container. A need has, therefore, arisen for a method of making such container bodies or tubes, which does not utilize moisture in the adhesive, and which includes an adhesive that serves as a moisture barrier between plies of the container wall.

One prior-art solution to this problem associated with water-base adhesives, was to replace them with a 100% solids, synthetic resin, thermoplastic adhesive. However, the use of such thermoplastic adhesives requires that they be activated so that they are in a tacky condition during the process when the various plies of the container tube are bonded together. Activation of the thermoplastic adhesive is accomplished by applying an appropriate amount of heat to the latter. Heretofore, such heat was applied by the winding mandrel for the tubular container. The strips of material which formed the plies of the container wall and which carried the thermoplastic adhesives, were wound upon the mandrel in an unheated and untackified condition. The mandrel was retained in a heated state to provide the required amount of heat for activating the adhesive layers so that proper bonds could be established between plies. This method of activating the thermoplastic adhesive layers, however, has been unsatisfactory, because of the plies of material for constructing the container wall are, generally, of insulating substances. Therefore, the heat transfer between the mandrel and the outermost ply of the container, is generally insufficient to maintain proper operating conditions. For example, to assure that the adhesive layer associated with the outermost ply be rendered in an activated and tackified condition, the mandrel would have to be heated to a temperature exceeding considerably the temperature at the outer ply. This higher temperature of the mandrel, on the other hand, has caused overheating of the plies and adhesive layers within the vicinity of the mandrel, to the extent that they have often become deteriorated and burned. Furthermore, the heating of the mandrel, in this manner, gives rise to the problem of cooling and solidifying the adhesive after the formation of the tube, so that the plies of material do not become separated.

Accordingly, it is an object of the present invention to provide an improved method for making spirally or convolutely-wound container bodies or tubes of a plurality of plies, whereby no moisture is introduced in the material of the plies.

Another object of the present invention is to provide an improved method for making spirally or convolutely-wound tubular containers of fibrous or other materials wherein the adhesive used to secure the plies together, also functions as a moisture barrier.

Yet another object of the instant invention is to provide a method, of the character described, wherein an adhesive is pre-applied to the plies, and the adhesive is rapidly and efficiently activated so as to permit high-speed bonding of the plies and the formation of the tubular products.

Still another object of this invention is to provide a method, as set forth, whereby the resulting tubular products have improved strength, stiffness, moisture resistance and surface finish.

A further object of the present invention is to provide a method, of the character described, wherein the flanging and seaming of the tubular products is simplified, and no defects result from bonding of the plies.

A yet further object is to provide a method, as set forth, whereby the thermoplastic adhesive may be applied to both sides of the material constituting a ply, or to the two surfaces of adjacent plies to be bonded together.

A still further object of the instant invention is to provide a method, as described, whereby heat may be applied to the strip of material carrying the thermoplastic adhesive layer, or the material which is to be bonded to the adhesive layer, or to both such strips.

Numerous other objects and advantages of the present invention will become apparent as it is understood from the following description taken in connection with the accompanying drawings.

With the preceding objects in view, the method consists of subjecting a surface of one or more strips of sheet material to a source of high temperature while the strip is traveling toward a winding mandrel; wrapping the heated strip around the mandrel to form a multi-ply tube, at least one of the strips forming the plies of the tube having a pre-applied thermoplastic thereon so as to provide the adhesive between each of the plies; transferring the heat energy derived from the temperature source to the adhesive to activate it to a tacky condition for bonding the plies together; and thereafter cooling the resultant formed tube while it is still on the mandrel to set the adhesive and secure the plies together.

Other features, advantages and details of the invention appear in the following specification taken in conjunction with the accompanying drawing which discloses a preferred embodiment thereof, and in which:

FIG. 1 is a fragmentary plan view of one form of apparatus useful in practicing the method of the instant invention;

FIG. 2 is a sectional view taken substantially along line 2—2 in FIG. 1, and shows the application of heat to the thermoplastic adhesive layer;

FIG. 3 is a sectional view taken substantially along line 3—3 in FIG. 1, and shows the construction of the tubular container wall formed by the method of this invention; and FIG. 4 is a fragmentary sectional view taken substantially along line 4—4 in FIG. 3, and shows, on an enlarged scale, the relationship between the plies of the material and the thermoplastic adhesive layer.

Referring to the drawing, a stationary winding mandrel 10 is held and supported, at one end, by a fixed housing 11. The other end of the mandrel is a free end. A tubular body or container 14 is constructed of strips of material 17 and 18 which are supplied to the mandrel from storage spools, or rollers, not shown in the drawing. By well-known, suitable means (not shown), the strips 17 and 18 are directed toward the mandrel at angles which assure that the edges of the strips abut against or overlap each other.

The winding of the strips of material 17 and 18 about the mandrel so as to form the tubular product 14, is accomplished by a moving belt 23. Drive pulleys 25 and 26 span and support the belt. The belt 23 is wound upon the pulleys so that it has a 180° twist and, in addition, one side of the belt is looped completely about the outer surface of the tubular product 14 disposed on the mandrel. When the belt 23 moves in the direction indicated by the arrows on the drive pulleys in FIG. 1, it imparts to the tubular container 14 both rotational and translational motion. The rotational motion causes the strips of material 17 and 18 to wind about the mandrel, whereas the translational motion causes the wound strips to advance longitudinally along the mandrel and towards the free end thereof. These two motions combine to wind the strips of material on the mandrel and upon each other at the proper angle so that the edges overlap, or are in close contact with each other so that a sealed surface is thereby produced. The continuous tubular product formed on the mandrel may be cut to the desired length after having been advanced along the mandrel and beyond the location of the belt.

In order to form a rigid product capable of withstanding stresses and strains, the strip 18 is wound upon the base strip 17 so that the joining edges of the strip 18 do not coincide with those of strip 17. Thus, the joining edges of strip 18 are staggered with respect to the joining edges of strip 17, tnd the latter are fully covered by the surface of the strip 18. This particular scheme of winding the strips relative to each other, is automatically established by the relative positions of the strips as they are fed to the mandrel. The latter, on the other hand, has a polished surface to allow the wound strips to move on the mandrel both rotationally and translationally with a minimum amount of resistance.

The strips of material 17 and 18 for generating the tubular container, may be made of metal, metallic alloys, fibers, cloth, or combinations of these materials. Furthermore, one strip or ply of material may differ from its adjacent plies. The strips may be dispensed for winding upon the mandrel from either rolls or spools, or from pre-cut lengths of material. The process, moreover, is not restricted to winding two strips of material in contact with each other to form a two-ply product. The process may be readily extended to include any number of such desired plies, by feeding additional strips toward the mandrel in the manner described supra.

In the embodiment shown in the drawing, the basic layer strip 17 is made of aluminum foil. The strip 17 is wound upon the mandrel in a manner whereby the edges overlap by a predetermined amount, as illustrated in FIGS. 1 and 3. This particular overlapping construction of aluminum foil, provides an especially rigid inner ply, as well as one which contains no moisture and serves as a moisture barrier. The outer ply which is constructed of strip 18, on the other hand, is wound upon the inner ply so that the edges are in close contact with each other to produce a smooth outer surface thereby. Whenever desired, the inner strip 17 may be wound upon the mandrel so that the edges are in close contact with each other rather than in an overlapping relationship. In such a case the strip 17 would be wound in a manner similar to that of strip 18.

For the purpose of bonding the strips 17 and 18 together as they are wound on the mandrel 10, the outer surface of the strip 17 and the inner surface of the strip 18 are provided with layers or coatings 17a and 18a of a thermoplastic resin adhesive such as polyethylene. Strips of material with this adhesive layer may be prepared in advance and stored for use as required. While thus stored, the adhesive layer is in an inactive state.

In accordance with the instant invention, the thermoplastic resin adhesive 18a, is heated as the strip 18 approaches the mandrel 10. The adhesive is thereby rendered tacky and conditioned to form a bond between the adjacent strips of material 17 and 18. For the purpose of heating the adhesive layer, a suitable heat source 35 is situated in the path of movement of the strip 18. The heat source 35 applies heat and activates the resin adhesive 18a shortly before it moves with the strip 18 onto the mandrel 10, and into contact with the strip 17.

When applying heat to strip 18 for the purpose of activating the layer 18a, sufficient heat is applied to the strip so that when the layer 18a contacts layer 17a, upon being wound upon the mandrel, layer 17a also becomes activated thereby. This particular procedure for bonding the strips 17 and 18 together, results in an especially strong bond and, at the same time, requires only one heating source. However, the bonding of the strips 17 and 18 is not limited to this particular embodiment shown in the drawing. It is also quite permissible, for example, that only strip 18 have a layer of thermoplastic resin adhesive 18a, and that, after heating the latter, a bond is formed directly with the outer surface of strip 17. Thus it is not essential that the intervening layer 17a be present in order to form a satisfactory bond between the strips. However, by introducing the separate layer 17a and causing it to be activated, a stronger bond is produced than otherwise.

The bonding of the overlapping edges of strip 17 illustrates the situation that prevails when only one of the two surfaces to be bonded is coated with the resin adhesive. For example, in the case of strip 17, only the outer surface is coated with an adhesive layer 17a. Therefore, when the edges are wound upon the mandrel in an overlapping manner, the inner surface of the overlapping edge engages the coated outer surface of the edge laid upon the mandrel immediately beforehand so as to become overlapped. Accordingly, at such an overlapped joint, the inner surface of strip 17 is in contact with the coated outer surface of strip 17. Since the inner surface of strip 17 is uncoated, only one layer of resin adhesive prevails between the overlapped edges.

Although the strip 18 is heated sufficiently to also activate the adhesive layer on strip 17, such heating is not, at all times, sufficient to activate the portion of the layer prevailing between the overlapped edges of the strip 17. To activate this portion of the layer between the overlapped edges, it is necessary that heat be transferred from strip 18 directly through the body and thickness of the strip 17, where the latter overlaps. Since the heat transfer through the body of strip 17 is a time-related function, even though the strip is made of aluminum foil, the strip 18 would have to be heated to a considerably higher degree if the heat transfer were to be sufficiently rapid so as not to require slowing down of the winding and manufacturing process. In order to avoid the necessity of having to heat strip 18 to an intensely high temperature and to avoid the disadvantages resulting therefrom, the portion of the adhesive layer between the overlapped edges is tackified by a separate heat source 36. This heat source applies heat directly to the strip 17, at the location where the edges overlap, so that the adhesive between the edges becomes activated and bonds or seals the edges together.

The heat source 36 may be in a stationary position as the wound strip 17 moves along underneath it. For this purpose, it is only necessary to control the translational motion of the wound strip in relation to its rotational motion. For example, in order that the heat source may remain stationary, the wound strip must be rotated through one revolution while it is advanced along the mandrel through a distance equal substantially to the width of the strip.

The heat for applying to the resin adhesive layer, may be derived from the burning of gas, electrical resistance heating, circulating heated air or some other appropriate inert gas, or the like. Normally, the adhesive layer is subjected to a temperature of 330°–360° F. for the purpose of activating it and bringing it to a tacky condition. In order to distribute the heat uniformly throughout the adhesive layer, several banks of heaters may be stacked along the path of the strip 18. If, for example, only a single heater is used for activating the adhesive, then, depending on the speed of the strip 18, the applied heat has to be so intense that the surface of the adhesive layer becomes seared while the base of the layer in contact with the material 18 is in a relatively cool condition. By providing a plurality of heaters, therefore, the heating process is extended over a larger area and hence over a greater period of time, with the result that the molecular structure of the adhesive layer 18a is uniformly activated throughout the thickness of the layer. Furthermore, when heating the stirp 18 so that it also activates the layer 17a, the material of strip 18 may also be uniformly heated throughout its thickness when using such a plurality of heaters. In this manner the strip 18 is able to store a larger amount of heat and function as a reservoir for releasing the stored heat to activate the layer 17a when contacting same.

The heat source 35 may be located within one to three feet from the mandrel, depending upon the speed of the strip 18 and the number of heating banks used. The speed of the strip to be wound, on the other hand, varies with the diameter of the container product, and is faster for larger such diameters. Corresponding to a 401D container, for example, the linear speed of the strip material is approximately 300 feet per minute.

FIG. 1 shows that the heat source 35 is in the form of two heating banks applied only to strip 18. As already indicated, the number of heating banks may be extended to any appropriate number, and equally effective results may be obtained if the heat source is applied to strip 17 rather than strip 18. Under this condition, the heat source may be located along the path of strip 17 instead of the strip 18. At the same time, heat sources may be associated with both strips. It is also not essential that the heat source be associated with a strip carrying the adhesive coatign. Effective results may be obtained with any number of different methods. Thus, heat may be applied to the strip carrying the coating, or the strip contacting the coating, or both.

By applying heat, as in the instant invention, to the resin adhesive before it arrives at the winding mandrel, it is unnecessary to heat the latter to the temperature at which the adhesive layer becomes activated. In this case the mandrel has to be heated only to that temperature whereby the adhesive layer remains in the activated or tacky state. Thus, the temperature required to maintain the adhesive layer in the activated state, is considerably lower than that required to bring the adhesive layer from an unactivated state to an activated one. Accordingly, it is permissible to confine the temperature of the mandrel within the range of 120°–220° F., which is significantly lower than the temperature of the heating source generally within the range of 330°–360° F. The requirement for heating the mandrel arises from the condition that the resin adhesive remain tacky until the formed tubular container has passed the location of the belt 23. In this manner, the portion of the belt looped around the outer surface of container 14 has the opportunity to press firmly together all of the plies of the container body so that a solid container wall, without defects, is obtained. The belt 23, therefore, performs a molding function in addition to imparting rotational and translational motions for purposes already indicated.

The required heating of the mandrel may be accomplished by circulating suitable heating fluid 28 through appropriate tubing 30 within the mandrel. It is to be noted that the tubing 30, for heating purposes, extends along the mandrel only to the location of the belt 23. In this manner, the resin adhesive is maintained in the tacky condition until the wound strips have passed the location of the belt, and, at the same time, the cool portion of the mandrel to the right of the belt in FIG. 1, allows the adhesive layers to set rapidly so that the tubular container may be removed from the mandrel for further processing. Thus, only a portion of the mandrel is heated for the purpose of maintaining the adhesive layers activated and in the tacky condition until they are acted upon by the belt 23. If the mandrel were not heated in this manner, the heat applied by the source 35 to strip 18, for example, would be rapidly extracted by the cooler mandrel when the strip comes into contact therewith, and as a result, the adhesive layers would become deactivated before any bonding of the strips takes place. Rapid transfer of heat from the strip to the mandrel occurs when the latter is not heated, because of the large mass and hence heat storing capacity of the mandrel when compared to the strip.

In view of the fact that the instant invention permits a lower mandrel temperature, the wear of the belt 23 is decreased, resulting in a considerably longer operating life thereof. The lower temperature of the mandrel also results in a container body having more favorable structural properties. For example, when the container body is to be constructed of several plies, and the adhesive layer is to be activated while in contact with the mandrel or an adjacent ply, then the mandrel must be heated to the temperature which assures activation of the outermost adhesive layer. If the container wall is to be constructed of plies including cloth or fibers, such plies would function as heat insulators, and therefore the plies adjacent to the mandrel would be subjected to a considerably higher temperature than the outermost ply. Accordingly, under these conditions, the temperature of the mandrel must be considerably greater than that required to activate, to a tacky condition, the outermost adhesive layer. Such high temperature of the mandrel, on the other hand, may cause overheating of the adhesive layer adjacent to the mandrel, thereby resulting in a defective bond between plies associated therewith.

By applying the method of the instant invention, these problems are avoided, and a container of solid construction is obtained. Furthermore, since the mandrel, in the instant invention, remains relatively cool, the resin adhesive sets especially rapidly after passing the belt location 23, to form strong moistureless bonds between the plies of the container body. Since moreover, no moisture is introduced in the bonding process, any moisture-absorbing material used in the construction of the container is maintained completely dry. Therefore, container bodies made from, for example, kraft paper, are not weakened as they would be if a water-base adhesive were used.

In the instant invention, the adhesive layer is not restricted to being made of polyethylene. Any thermoplastic, or mixtures including a thermoplastic generally known as hot melts, having suitable properties of adhesion, may be utilized for this purpose. For example, composition of the types disclosed in U.S. Pats. 2,218,116 and 2,640,501 are applicable. Individual thermoplastic resins such as polystyrene or polyamide may also be used. Polyethylene, however, is preferred as the adhesive, because of its favorable availability and cost features, as well as its low moisture permeability. Each of the adhesives that may be used has its own optimum temperature range within which it becomes activated, and its own optimum bonding temperature. These temperatures associated with the adhesive materials, are well known to the art. For example, the optimum bonding temperature of polyethylene, is approximately 350° F.

In applying the instant invention, it is essential that the heat energy imparted to the adhesive layer, prior to its being wound, be sufficient so that the adhesive is at its optimum bonding temperature during its engagement with adjacent plies, for generating the tubular container. Thus the heat energy applied to the adhesive, must take into account the heat losses that occur between the location at which the adhesive layer is treated by the heat source, and the location at which the adhesive layer becomes bonded to either another adhesive layer, or to an adjacent ply of winding material. These losses are a function of the speed of the moving strip, and the distance that the heat energy source is spaced from the winding mandrel. At the same time, the heat energy imparted to the adhesive layer, is a function of the time interval during which the strip is exposed to the heat source. This time interval is, in turn, dependent upon the linear speed of the strip, as well as the number of heating banks located along the path of the strip, as described supra.

The speed of the strip, on the other hand, is established by the particular capacity of the winding machine for processing the strip materials to form a container body of a particular diameter. Therefore, the distance of the heat source from the mandrel is ordinarily determined by the specifically selected values of the preceding parameters. However, this distance between the heat source and the mandrel is limited by the condition that the temperature of the adhesive should not be raised to the point where degradation of the adhesive layer or the molecular structure of the winding material takes place. Accordingly, it is generally desirable to locate the heat source as close to the mandrel as possible, without interfering with the operation of the winding machine.

It is also a feature of the instant invention, that it is not essential to employ the heat source in conjunction with a strip carrying an adhesive layer. Satisfactory bonds in multi-ply containers are also obtainable by first winding an adhesive-coated strip onto the mandrel so that the adhesive layer is in the inactive or unheated state. This adhesive layer is thereafter activated by bringing it into contact with an uncoated strip which has been subjected to the treatment of the heat source at the temperature required for forming a proper bond. This heated strip which does not carry an adhesive layer serves, in this case, as a heat reservoir for transmitting heat to the adhesive layer on the previously wound strip. The final result of this method is a bond between the adhesive layer of the initially wound strip and the direct surface of the material associated with the heated strip.

We claim:

1. In a method of making tubular products which includes winding at least two strips of material on a mandrel to form a tube, the improvement comprising the steps of:
   providing at least one surface of one of said strips with a coating of a heat activatable resinous adhesive;
   feeding said strips to the mandrel so as to position said adhesive between said strips when they reach the mandrel; and
   passing said adhesively coated strip through a heating zone which extends longitudinally along the path of travel of said strip as it approaches the mandrel so as to store heat in said strip and to render said adhesive sufficiently tacky to form a bond between said strips when wound on the mandrel.

2. A method of making tubular products as set forth in claim 1 in which said resinous adhesive is polyethylene.

3. In a method of making tubular products which includes winding a pair of strips of material on a mandrel to form a tube, the improvement comprising the steps of:
   providing one surface of one of said strips with a coating of a thermoplastic resin adhesive;
   feeding said strips toward the mandrel so as to position said coating between said strips when they reach the mandrel; and
   applying heat to said coated strip in a heating zone which extends longitudinally along the path of travel of said coated strip before said coated strip is wound on said mandrel to heat said strip throughout its thickness and to render said coating sufficiently tacky to form a bond between said strips when wound on the mandrel.

4. A method of making tubular products as set forth in claim 3 in which said thermoplastic resin adhesive is polyethylene.

5. A method of making spirally wound tubular products comprising the steps of:
   feeding a first strip of material having a preapplied non-tacky coating of a thermoplastic adhesive on one surface thereof to a winding mandrel;
   winding said strip onto said mandrel with its longitudinal edge portions in overlapping relationship and with its coated surface facing away from said mandrel;
   heating said overlapping edge portions to activate said coating to thereby bond said overlapping edge portions together;
   feeding a second strip of material having a preapplied non-tacky coating of a thermoplastic adhesive on one surface thereof to the winding mandrel;
   passing said second strip through a longitudinally extending heating zone as it approaches the winding mandrel so that said strip is in a heated condition and said thermoplastic coating is in a tacky condition upon arrival at the mandrel; and
   winding said heated second strip onto said first strip around said mandrel to bring the tacky coating on said second strip into contact with the coating on said first strip to thereby bond said strips firmly together.

References Cited

UNITED STATES PATENTS

| | | | |
|---|---|---|---|
| 3,156,401 | 10/1964 | Krause | 229—4.5 |
| 2,931,278 | 4/1960 | Ignell | 93—80 |
| 3,400,029 | 9/1968 | Mesrobian et al. | 156—190 XR |
| 2,393,347 | 1/1946 | Stuart et al. | 156—195 XR |
| 3,196,762 | 7/1965 | Schmeltz | 156—190 XR |

PHILIP DIER, Primary Examiner

U.S. Cl. X.R.

156—195, 428, 320; 93—80, 94; 229—4.5; 138—130, 144